US007667717B2

(12) United States Patent
Baudisch

(10) Patent No.: US 7,667,717 B2
(45) Date of Patent: Feb. 23, 2010

(54) SYSTEM AND METHOD FOR DISPLAYING IMAGES UTILIZING MULTI-BLENDING

(75) Inventor: Patrick M Baudisch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 37 days.

(21) Appl. No.: 10/859,747

(22) Filed: Jun. 3, 2004

(65) Prior Publication Data

US 2005/0093890 A1    May 5, 2005

Related U.S. Application Data

(60) Provisional application No. 60/478,294, filed on Jun. 12, 2003.

(51) Int. Cl.
*G09G 5/02* (2006.01)
*G09G 5/14* (2006.01)

(52) U.S. Cl. .................. 345/639; 345/629; 715/768

(58) Field of Classification Search .......... 345/639, 345/629, 660; 715/768
See application file for complete search history.

(56) References Cited

U.S. PATENT DOCUMENTS

| 5,517,437 | A | * | 5/1996 | Yamashita et al. ........ 708/490 |
| 6,380,945 | B1 | * | 4/2002 | MacInnis et al. ........ 345/602 |
| 6,384,840 | B1 | | 5/2002 | Frank |
| 6,518,970 | B1 | * | 2/2003 | Glen et al. .............. 345/501 |
| 6,587,111 | B2 | * | 7/2003 | Nakamura et al. ........ 345/522 |
| 6,700,588 | B1 | * | 3/2004 | MacInnis et al. ........ 345/629 |
| 6,781,591 | B2 | * | 8/2004 | Raskar .................. 345/582 |
| 6,927,778 | B2 | * | 8/2005 | Aleksic et al. .......... 345/592 |
| 7,002,602 | B2 | * | 2/2006 | MacInnis et al. ........ 345/629 |
| 2002/0171682 | A1 | | 11/2002 | Frank et al. |
| 2003/0137522 | A1 | * | 7/2003 | Kaasila et al. .......... 345/619 |
| 2004/0042662 | A1 | * | 3/2004 | Wilensky et al. ........ 382/194 |
| 2005/0001852 | A1 | * | 1/2005 | Dengler et al. .......... 345/633 |
| 2005/0088464 | A1 | * | 4/2005 | Bernstein ................. 347/5 |
| 2005/0093890 | A1 | * | 5/2005 | Baudisch ............... 345/639 |
| 2005/0253877 | A1 | * | 11/2005 | Thompson .............. 345/698 |
| 2005/0268226 | A1 | * | 12/2005 | Lipsky et al. ............ 715/515 |

OTHER PUBLICATIONS

DeepDocument: use of a multi-layered display to provide context awareness in text editing Masood Masoodian, Sam McKoy, Bill Rogers, David Ware May 2004 AVI '04: Proceedings of the working conference on Advanced visual interfaces Publisher: ACM.*
Blueprints: illustrating architecture and technical parts using hardware-accelerated non-photorealistic rendering Marc Nienhaus, Jürgen Döllner May 2004.*
Baudisch, P., and C. Gutwin, "Multiblending: Displaying Overlapping Windows Simultaneously Without the Drawbacks of Alpha Blending," Proceedings of the SIGCHI Conference on Human Factors in Computing Systems, Vienna, Austria, Apr. 24-29, 2004, pp. 367-374.

* cited by examiner

*Primary Examiner*—Javid A Amini
(74) *Attorney, Agent, or Firm*—Lee & Hayes, PLLC

(57) ABSTRACT

A system and method for processing images utilizing varied feature class weights is provided. A computer system associates two or more images with a set of feature class data, such as color and texture data. The computer system assigns a set of processing weights for each of the feature classes. The two or more images are blended according to the feature class weights. The blended image can be further adjusted according to the content of the images.

26 Claims, 5 Drawing Sheets

SYSTEM AND METHOD FOR DISPLAYING IMAGES UTILIZING MULTI-BLENDING

CROSS-REFERENCES TO RELATED APPLICATIONS

This application claims the benefit of U.S. Provisional Application No. 60/478,294, entitled "MERGING WINDOWS: TECHNIQUES FOR SIMULTANEOUSLY DISPLAYING TWO OR MORE WINDOWS ON THE SAME SCREEN SPACE," filed on Jun. 12, 2003. U.S. Provisional Application No. 60/478,294 is incorporated by reference herein.

FIELD OF THE INVENTION

In general, the present application relates to computer software, and in particular, to a system and method for displaying multiple images on a graphical user interface utilizing multi-blending.

BACKGROUND OF THE INVENTION

Generally described, computer systems provide users with an opportunity to use a number of software applications. In many operating environments, users can instantiate two or more software applications at the same time, often referred to as multi-tasking. For example, a user can instantiate a word processing program, electronic mail program and Internet browser software application at the same. To access each instantiated software application, the user can manipulate various controls, such as a mouse or keyboard, to select a particular instantiated software application.

In a typical embodiment, at least of portion of each instantiated software application can be displayed to the user in the graphical display as a graphical window. Additionally, each graphical window can be organized in manner that allows multiple graphical windows to be visible to the user at the same time. Because multiple graphical windows may be displayed concurrently to the user, there are situations in which at least a portion of the graphical windows overlaps. Because two or more graphical windows may be overlapping, a typical operating environment resolves an overlap in a variety of manners.

In the simplest solution, each graphical window is associated with an order display priority. In the event that graphical windows overlap, the window with the greatest display priority will be displayed in its entirety. Any underlying graphical windows with a lower priority are displayed with the overlapping portion of the graphical window removed. With reference to FIG. 1, an illustrative screen display 100 includes two graphical windows 102, 104 corresponding to instantiated software applications. As illustrated in FIG. 1, at least a portion of the graphical windows 102, 104 overlaps, as illustrated at 106. Assuming that the graphical window 104 has a higher display priority, graphical window 104 is display in its entirety, while graphical window 102 is displayed with the overlapping portion 106 omitted. Thus, graphical window 104 appears to be the foreground image, while graphical window 102 appears to become the background image.

In addition to resolving display priorities between graphical windows corresponding to instantiated software applications, in another typical embodiment, a software application may be associated with one or more tools that are displayed to the user as part of the display of the software application. The user tools are often referred to as "palettes." Palettes can be displayed to the user as separate graphical windows that have a higher display priority than the underlying software application graphical window. With reference now to FIG. 2, an illustrative screen display 200 includes a single graphical display corresponding to an instantiated software application. The screen display 200 includes some underlying content 202 being displayed to the user. In addition to the screen display 200, two palettes 206, 208 are displayed with a higher display order than the underlying screen display 200.

In both of the above examples, at least a portion of the underlying content from a graphical window having a lower display priority is occluded from the view of the user. Although users can adjust location of each graphical window and/or utilize larger screen displays or multiple screen displays, there are many embodiments in which graphical windows may overlap and in which the user does not wish to have the underlying content complete occluded from view.

One approach for allowing at least a portion of underlying content to be visible to a user corresponds to the association of a transparency property to the higher display priority graphical window. A typical conventional approach to associating transparency properties to images is referred to as alpha blending. One skilled in the relevant art will appreciate that alpha blending relates to the association of a single weighted value to the color value data for each pixel of a foreground and background image. The degree of transparency corresponds to the weight placed on the foreground image. Equation 1 defines alpha blending for a color schema defining images according to its red, green and blue color values ("RGB") as:

$$RxGxBx = R1\alpha + R2(1-\alpha) + G1\alpha + G2(1-\alpha) + B1\alpha + B2(1-\alpha) \quad (1)$$

where: R1G1B1=color pixel values for a first image;
R2G2B2=color pixel values for a second image; and
$\alpha$=alpha value The utilization of RGB values to represent images and the utilization of alpha blending to provide transparency properties to images are well known in the art and will not be described in greater detail.

Although the utilization of alpha blending facilitates the display of underlying content, alpha-blending techniques can become deficient in a variety of manners. In one aspect, the blending of foreground and background images can affect the readability of either the foreground or background content. In another aspect, in the event that content from both the foreground and background is similar in some way (such as color, shape, size, etc.), conventional alpha blending techniques may make it difficult for a user to determine whether the "blended" content belongs to the foreground or background image.

Thus, there is a need for a system and method for displaying images that facilitates content readability and/or content identification.

SUMMARY OF THE INVENTION

A system and method for processing images utilizing varied feature class weights is provided. A computer system associates two or more images with a set of feature class data, such as color and texture data. The computer system assigns a set of processing weights for each of the feature classes. The two or more images are blended according to the feature class weights. The blended image can be further adjusted according to the content of the images.

In accordance with an aspect of the present invention, a method for processing two or more images represented by a set of feature classes is provided. In accordance with the method, a computer system associates each of the two or more images with a set of feature class data. The computer system assigns a processing weight for each feature class. Additionally, the computer system processes the set of feature class data according to the assigned processing weight to generate a blended image.

In accordance with another aspect of the present invention, a method for blending a foreground image and a background image is provided. The foreground and background images are represented by a set of feature classes. In accordance with the method, a computer system assigns a processing weight for each feature class. The computer system then processes the set of feature class data for the foreground and background image according to the assigned processing weight to generate a blended image. Additionally, the computer system adjusts the blended image according to the content of the foreground and background image.

In accordance with still a further aspect of the present invention a method for processing two or more images represented by a set of feature classes is provided. A computer system associates each of the two or more images with a set of feature class data. The computer system assigns a processing weight for each feature class and processes the set of feature class data according to the assigned processing weight to generate a blended image. The computer system then adjusts the blended image according to the content of the two or more images.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
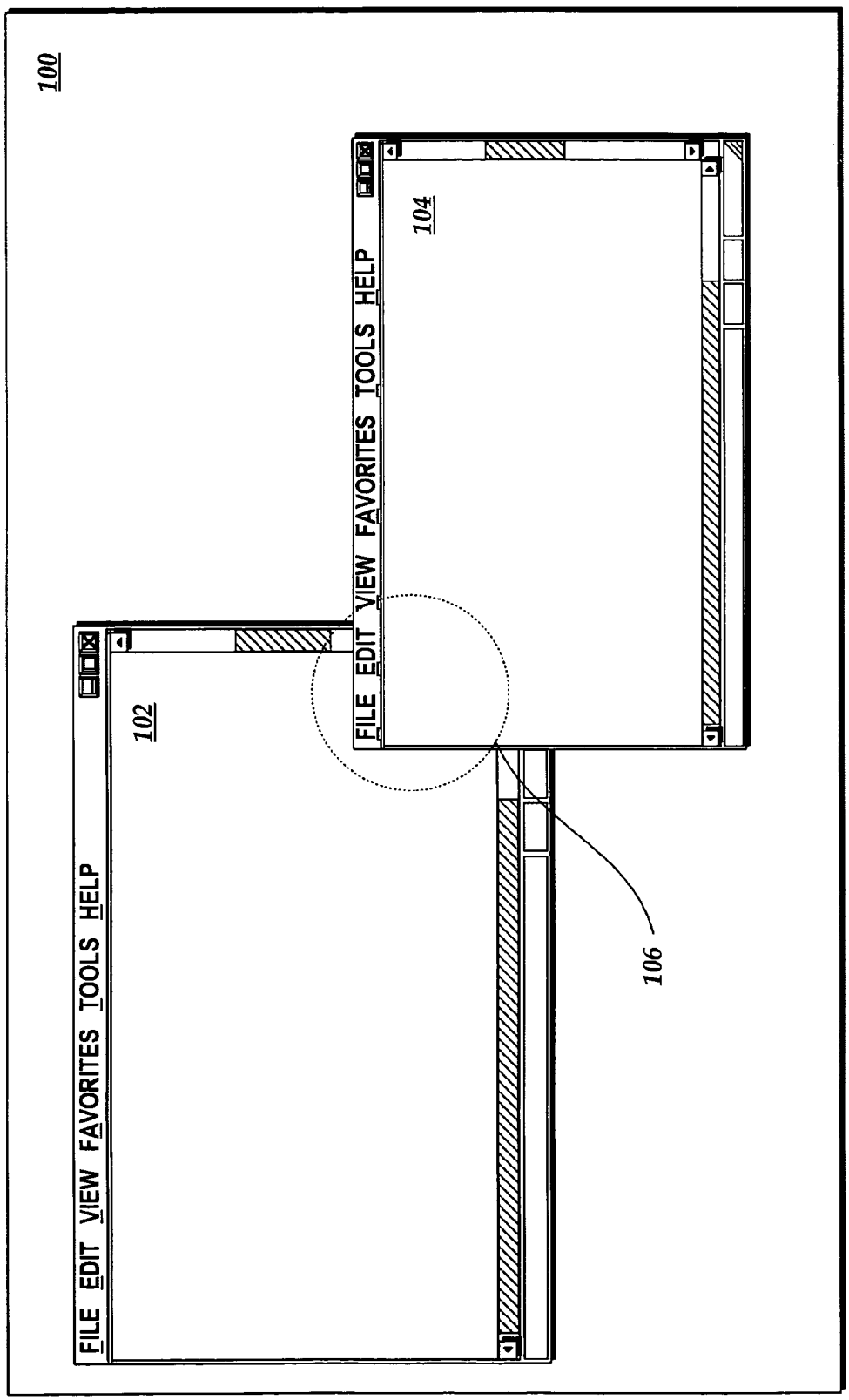
FIG. 1 is a block diagram of a screen display illustrating overlapping graphical windows in accordance with a conventional display embodiment.
Figure 2:
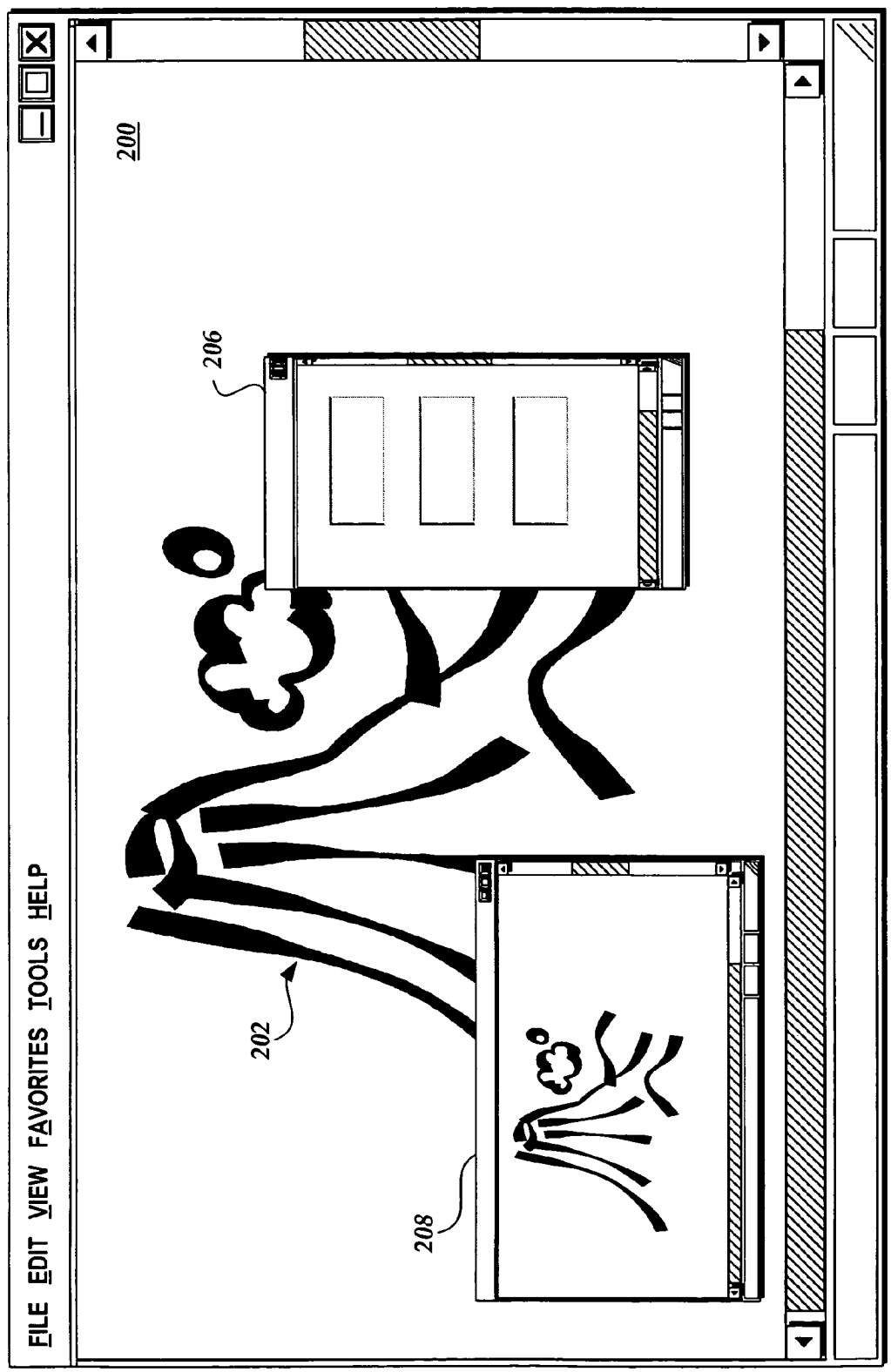
FIG. 2 is a block diagram of a screen display illustrating overlapping palette graphical windows in accordance with a conventional display embodiment.

Generally described, the present invention relates to a system and method for processing images. More particularly, the present invention relates to a system and method for applying individual weights to a set of features representative of two or more blended images. Features generally correspond to one or more pieces of data describing an attribute of an image and utilized by a computer system to render the image on a display. In an illustrative embodiment of the present invention, feature data can include color class data, such as RGB and CIE Lab color model. One skilled in the relevant art will appreciate that the CIE Lab color model corresponds to a perception-oriented color model that represents pixel color values in three channels, namely, luminance "L", red-green color different "A", and blue-yellow color difference "B".

The CIE Lab color model can be further described in K. McLaren, "The development of the CIE 1976 (L*a*b*) uniform colour-space and colour-difference formula," *Journal of the Society of Dyers and Colourists*, 92, 1976, 338-341, which is incorporated by reference herein. Additionally, feature data can also include texture class data that allows users to perceive contrast between images, such as edges or other areas of high contrast. Although the present invention will be described with regard to the CIE Lab color model and a single texture feature, one skilled in the relevant art will appreciate that the disclosed embodiments are illustrative in nature and should not be construed as limiting.

Similar to the RGB color model and as described above, pixel display attributes may be expressed in a CIE Lab color model according to "L", "a", and "b" values. In the event that there is overlapping content between two or more images, in an illustrative embodiment of the present invention, the overlapping content can be considered a weighted combination of the individual "L", "a", "b" color values for the two or more overlapping images. Additionally, in an illustrative embodiment of the present invention, the overlapping content can also be represented according to a weighted combination of the texture values of both images. However, unlike traditional alpha blending, the weights applied to each feature may be different. In accordance with the present invention, Equation 2 defines the combination of "L", "a", and "b" values as:

$$LxAxBx = (\omega 1 L1 + (1-\omega 1)L2) + (\omega 2 a1 + (1-\omega 2)a2) + (\omega 3 b1 + (1-\omega 3)b2) \quad (2)$$

where: L1a1b1=CIE Lab color pixel values for a first image;
L2a2b2=CIE Lab color pixel values for a second image;
$\omega 1$=weight value for L channel;
$\omega 2$=weight value for a channel; and
$\omega 3$=weight value for b channel.

In an illustrative embodiment of the present invention, $\omega 1$, $\omega 2$, and $\omega 3$, are selected in a manner that facilitates user recognition of the perception of each image. The individual weight values may correspond to a range of numbers from 0 to 1. Additionally, in an actual embodiment of the present invention, each weight value corresponds to a Boolean value of either "1" or "0". By limiting weight values to Boolean values, each feature class will correspond only to the channel values from one of the overlapping images. In an illustrative embodiment of the present invention, Equation 2 may be modified to include texture class data by the inclusion of a weight value or each texture class channel. Equation 3 corresponds to the modification of Equation 2 to include one or more channels of texture class data.

$$LxAxBx + \tau 1 - tX - = (\omega 1 L1 + (1-\omega 1)L2) + (\omega 2 a1 + (1-\omega 2)a2) + (\omega 3 b1 + (1-\omega 3)b2) + (\omega 4 \tau_1 1 + (1-\omega 4)\tau_2 1) \ldots + (\omega X \tau_1 X + (1-\omega X)\tau_2 X) \quad (3)$$

where: L1a1b1=CIE Lab color pixel values for a first image;
L2a2b2=CIE Lab color pixel values for a second image;
$\tau_1 1 - \tau_1 X$=texture channel values for the first image;
$\tau_2 1 - \tau_2 X$=texture channel values for the second image
$\omega 1$=weight value for L channel;
$\omega 2$=weight value for a channel;
$\omega 3$=weight value for b channel;
$\omega 4$=weight value for first texture channel; and
$\omega X$=weight value for $X^{th}$ texture channel.

Similar to the color channel data, the weight values for the texture classes can be expressed as Boolean value such that only one of the images can correspond to each texture feature class.

In an illustrative embodiment of the present invention, the individual channel weights may be pre-assigned by a user, by the software application, or according to the content being rendered. For example, the individual channel weights may relate to the type of overlapping content (e.g., overlapping palette graphical windows) to achieve a specific effect. An example of the blending of overlapping palette graphical windows will be described in greater detail below. Additionally, the channel weight values may be expressed as a series of weight values that may be manually or dynamically modified. For example, a computer may utilize a series of channel weights to achieve a transition between blended images.

Figure 3:
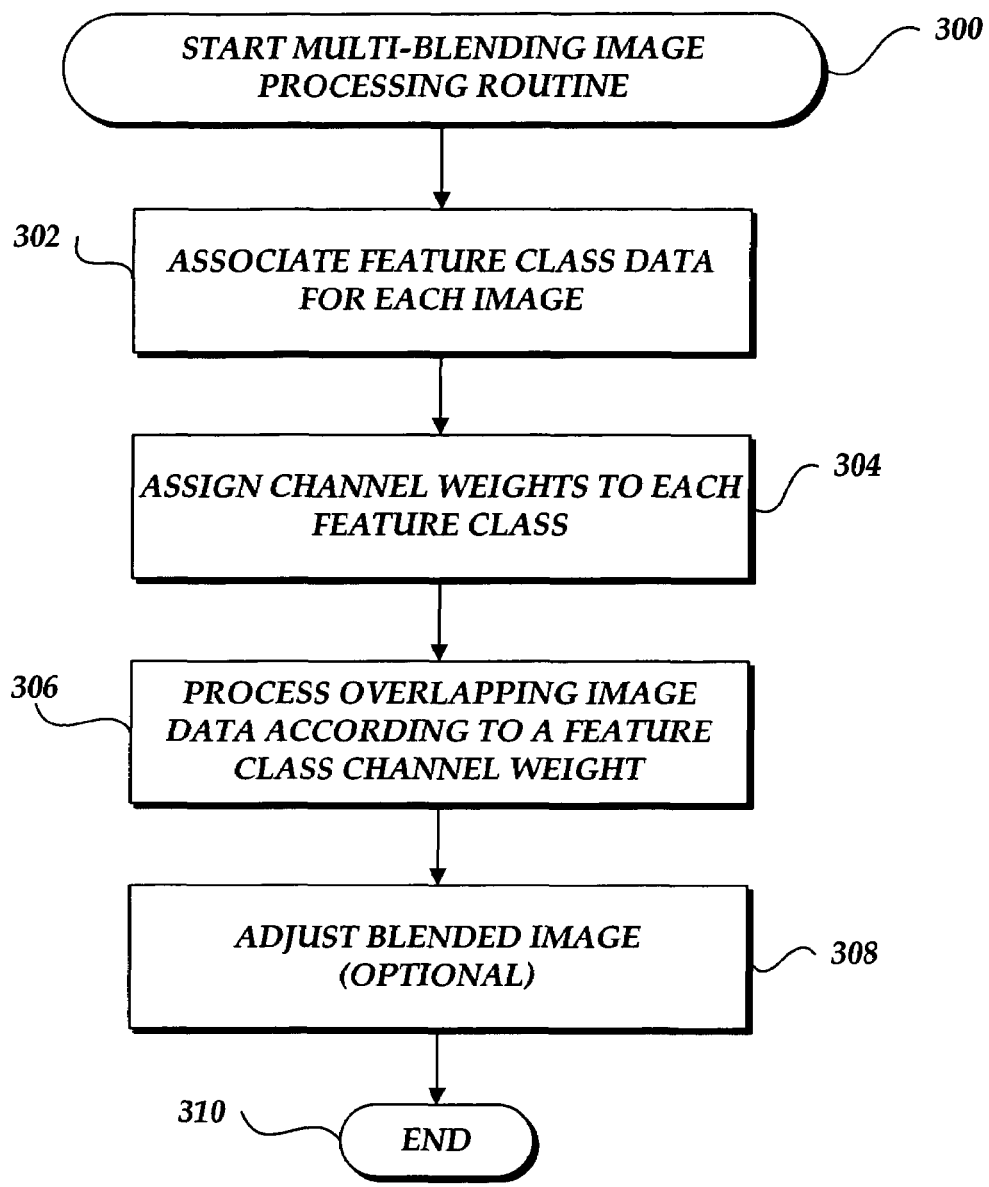
FIG. 3 is a flow diagram illustrative of a multi-blending display routine implemented by a computer system in accordance with an embodiment of the present invention.

With reference now to FIG. 3, a routine 300 for blending multiple images will be described. At block 302, a computer system associates two or more images to be blended with a set of feature classes. As described above, in an illustrative embodiment of the present invention, each pixel in an image may be represented according to its L, a and b CIE Lab color model value. Additionally, each pixel in an image may also be represented by one or more texture values as well. In the event that the pixel information for an image is represented in another color model, such as RGB, the routine 300 can include the translation of pixel color model data from another color model to the CIE Lab color model.

At block 304, the computer system associates channel weights for each of the feature classes. As described above, in an illustrative embodiment of the present invention, the channel weights may be pre-assigned based on user input, computer settings and/or the type of windows being blended. For example, a graphical window corresponding to a palette may be blended with different channel weights than two overlapping graphical windows corresponding to instantiated software applications. As also described above, in an illustrative embodiment of the present invention, the individual channel weights can be expressed as Boolean values.

At block 306, the two images are processed according to the particular channel weights to generate a combined set of feature values for each pixel. In an illustrative embodiment of the present invention, the image pixel data may be processed in a manner corresponding to Equation 2. For example, if the channel weights $\omega 1$, $\omega 2$, $\omega 3$, are set to "1", "0" and "1" values, the resulting pixel image would utilize the L and b values from the first image and the "a" color value from the second image. Additionally, if the texture channel weight is set to "0", the texture values, e.g., the edge values from the second image will be used. At block 308, the net set of feature values, e.g., color values and the texture values, may be adjusted to improve image displays. One skilled in the relevant art will appreciate that a number of image processing techniques/processes may be used to improve overall image displays. In one embodiment, image processing filters, such as contrast filters, color filters, blur filters and the like may be utilized to adjust the foreground or background images. In another embodiment, and as will be explained in greater detail below, channel data from one of the images may be ported to another channel to distinguish the foreground and background images. In a further embodiment, usage data may be utilized to diminish portions of a foreground image in favor of underlying content associated with a background image. In still a further embodiment, other traditional image processing techniques, such as alpha blending may also be utilized to improve the image displays. At block 310, the routine 300 ends.

Figure 4:
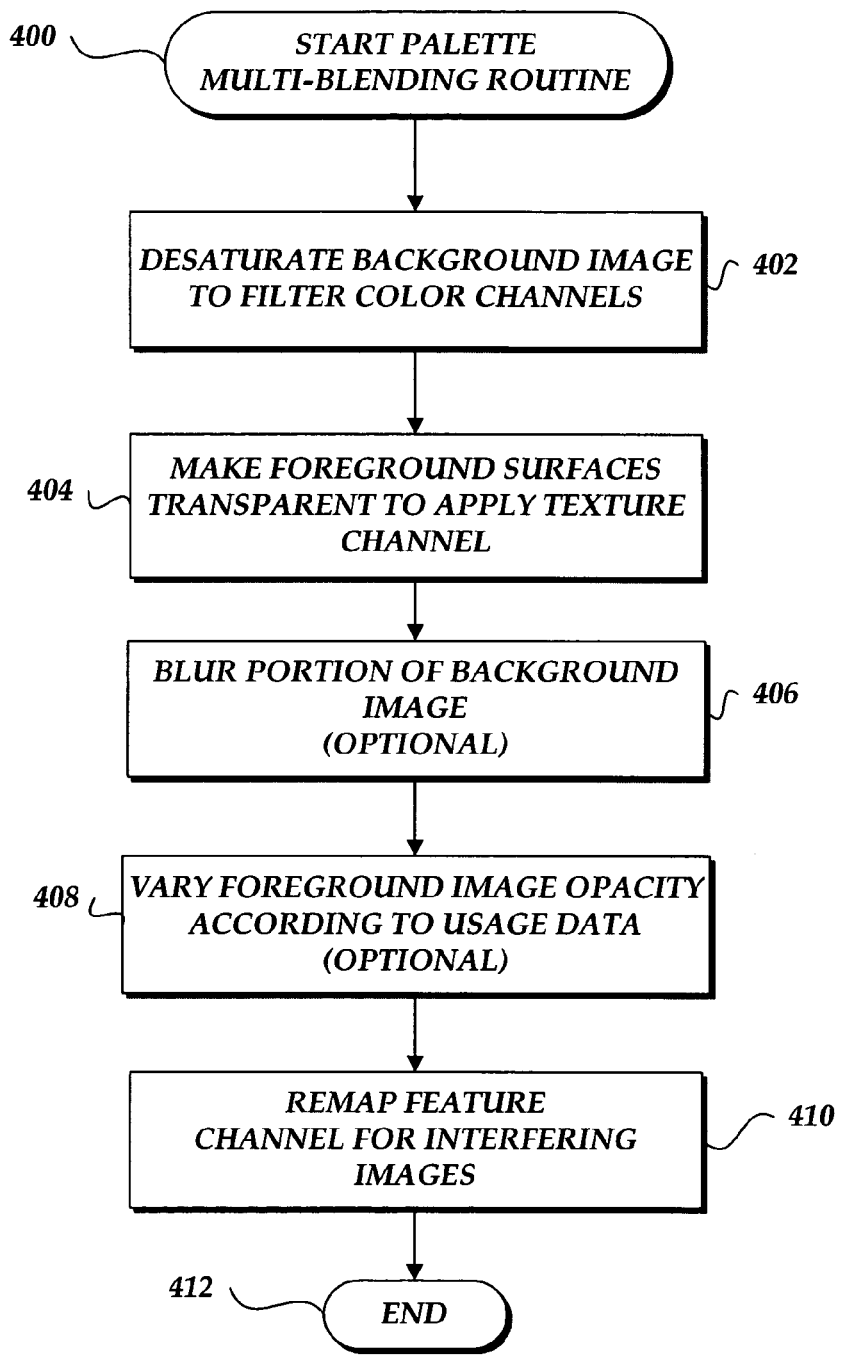
FIG. 4 is a flow diagram illustrative of a palette generation routine utilizing multi-blending and implemented by a computer in accordance with an embodiment of the present invention.

In an illustrative embodiment of the present invention, the multi-blending techniques described above may be utilized for representing graphical windows corresponding to a palette. FIG. 4 is a flow diagram illustrative of a palette multi-blending routine 400 implemented by a computer system in accordance with the present invention. Routine 400 corresponds to block 308 in which color channel weight values have been set for two images in which the background image corresponds to a photograph or other content and the foreground image corresponds to a palette. Based on the characteristics of the content, channel weights $\omega 1$, $\omega 2$, $\omega 3$, are set to "1", "0" and "0". Additionally, the texture values are set to "1."

With reference to FIG. 4, at block 402, the images are desaturated to apply the color channel weights. With reference to the working example, because of the channel weight settings, the blending image includes the red/green and blue/yellow values from the background image. However, the luminance values correspond solely to the foreground image. Thus, the background image colors are preserved and not diluted. At block 404, the palette surfaces are made transparent to apply the texture channel settings. In an illustrative embodiment of the present invention, palettes typically consist of icons corresponding to controls, whose contours can be recognized by users. Accordingly, to apply the texture channel settings, the image is filtered with a high-pass filter, such as an emboss filter, to bring out the edges of the controls. In essence, the image is filtered to call out its texture channel values. In an illustrative embodiment of the present invention, additional blending techniques, such as the linear light blending technique, may be applied to preserve light/dark contrast.

As described above, blocks 402 and 404 correspond to the application of Boolean weight channels. With continued reference to FIG. 4, in an illustrative embodiment of the present invention, the routine 400 can include additional processes that improve the overall improvement of the blended image (block 308, FIG. 3). One skilled in the relevant art will appreciate that the image improvement processes may be optional and/or dependent on the type of image content being blended. For example, the blending of two graphic images may require a different set of improvement processes than the blending of two textual messages. At block 406, a portion of the background image is blurred to eliminate high frequency interference associated with noisy backgrounds. More specifically, the overlapping portion of the background image may be blurred with a blur filter. Further, in an illustrative embodiment of the present invention, the blur filter may be configured to dynamically blur any portion of the background image overlapping with the foreground image as the foreground image moves. Thus, the resulting image provides high contrast for the foreground image and low contrast for the overlapping portion of the background image.

At block 408, usage data may be utilized to vary opacity of portions of the foreground image. In an illustrative embodiment of the present invention, usage data corresponding to selection data or other explicit or implicit user feedback systems, is used to vary portions of the display. For example, borders, unused icons, or persistent icons that a user is familiar with from a foreground image, such as a palette, may be diminished in favor of the background image.

At block 410, one or more feature channels may be remapped in the event of conflicting images. In an illustrative embodiment of the present invention, the foreground and background image may correspond to two images utilizing similar features to represent the content. For example, two images corresponding primarily to text may rely heavily on the luminance channel to represent. As described above, however, in an illustrative embodiment of the present invention, only one of the images will be able to use its luminance values because they otherwise interfere. Accordingly, one of the image's luminance values may be mapped to another channel, such as the red/green and blue/yellow difference values to mitigate interference. One skilled in the relevant art will appreciate that additional adjustment processes may also be utilized. At block 412, the routine 400 terminates.

Figure 5:
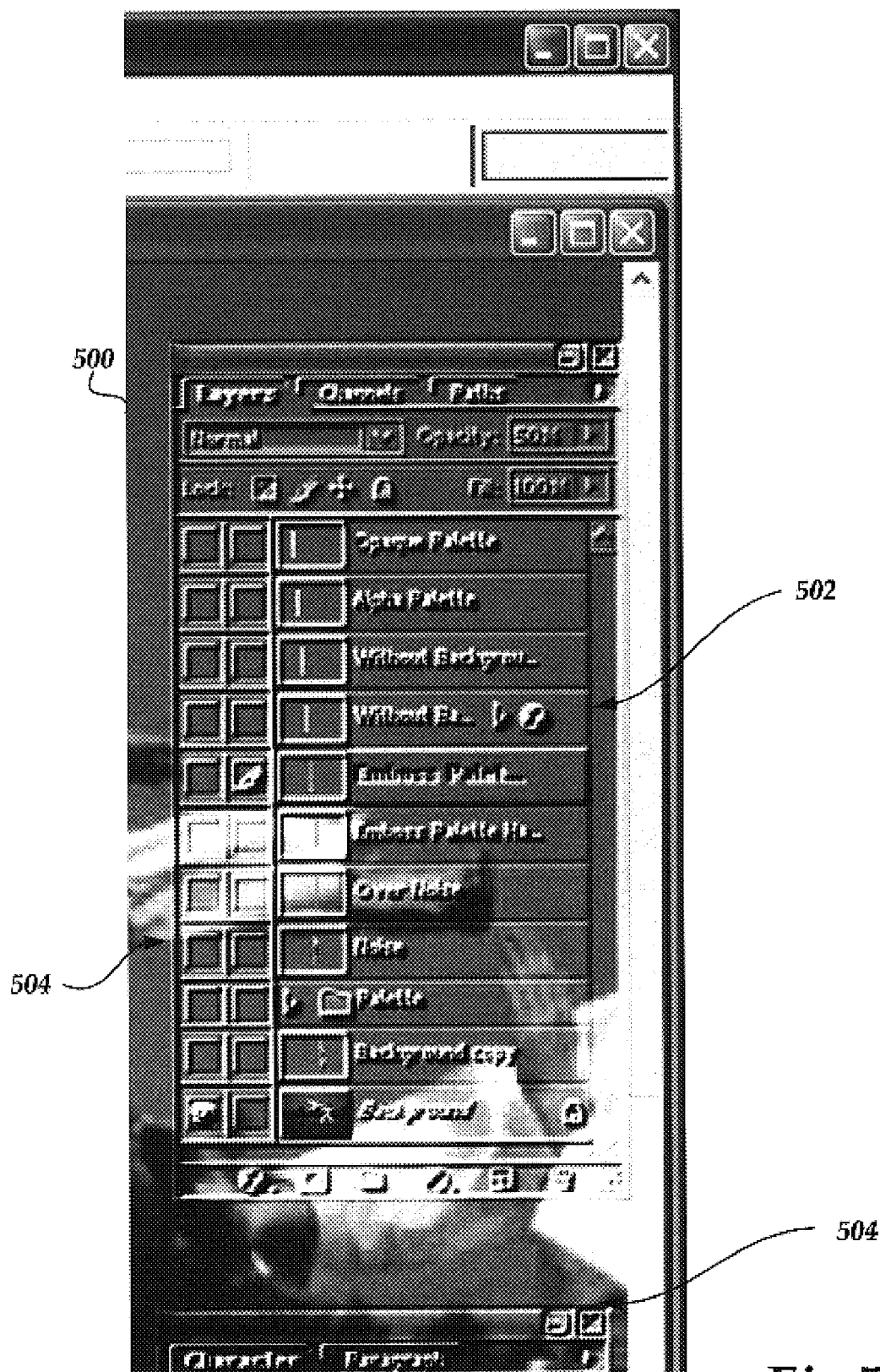
FIG. 5 is a block diagram illustrative of a screen display illustrating the processing of images utilizing multi-blending.

FIG. 5 is a block diagram illustrative of a portion of a screen display 500 illustrating the results of processing a foreground 502 and background image 504 in accordance with the present invention. As illustrated in FIG. 5, user recognition of the background image 504 is enhanced by preserving color channel values. Additionally, foreground image 502 recognition is achieved by preserving luminance and texture channel values. One skilled in the relevant art will appreciate the resulting screen display 500 is illustrative in nature and that alternative results may also be achieved within the scope of the present invention.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A computer-readable storage media having computer-executable instructions that, when executed, cause one or more processors to perform a method for processing two or more images represented by a set of feature classes comprising:
    associating each of the two or more images with a set of feature class data, including at least texture class data;
    independently assigning a processing weight for each of the set of feature classes;
    processing the set of feature class data according to the independently assigned processing weight to generate a blended image, the act of processing includes:
    summing multiple summands, including:
        a first summand being a summation of two addends, one of which is a product of a weight value for a luminance channel and luminance pixels for an image and another of which is a product of luminance pixels for another image and a difference between a constant and the weight value for the luminance channel,
        a second summand being a summation of two addends, one of which is a product of a weight value for a red-green color difference channel and red-green color difference pixels for the image and another of which is a product of red-green color difference pixels for the another image and a difference between the constant and the weight value for the red-green color difference channel,
        a third summand being a summation of two addends, one of which is a product of a weight value for a blue-yellow color difference channel and blue-yellow color difference pixels for the image and another of which is a product of blue-yellow color difference pixels for the another image and a difference between the constant and the weight value for the blue-yellow color difference channel, and
        a fourth summand being a summation two addends, one of which is a product of a weight value for a texture channel and texture channel values for the image and another of which is a product of texture channel values of the another image and a difference between the constant and weight value for the texture channel; and
    displaying the blended image.

2. The computer-readable storage media as recited in claim 1, wherein the set of feature class data corresponds to color class data.

3. The computer-readable storage media as recited in claim 2, wherein the color class data corresponds to CIE Lab color model data.

4. The computer-readable storage media as recited in claim 1, wherein the texture class data corresponds to edge data.

5. The computer-readable storage media as recited in claim 1, wherein the processing weight for each feature class is specified as a range of numbers between zero and one.

6. The computer-readable storage media as recited in claim 1, wherein the processing weight for each feature class is specified as a Boolean value.

7. A computer system for performing the computer implemented method recited in claim 1.

8. A computer-readable storage media having computer-executable instructions that, when executed, cause one or more processors to perform a method for blending a foreground image and a background image, wherein the foreground and background images are represented by a set of feature classes comprising:
    independently assigning a processing weight for each feature class;
    processing a set of feature class data for the foreground and background images according to the independently assigned processing weight to generate a blended image, the act of processing includes:
    summing multiple summands, including:
        a first summand being a summation of two addends, one of which is a product of a weight value for a luminance channel and luminance pixels for the foreground image and another of which is a product of luminance pixels for the background image and a difference between a constant and the weight value for the luminance channel,
        a second summand being a summation of two addends, one of which is a product of a weight value for a red-green color difference channel and red-green color difference pixels for the foreground image and another of which is a product of red-green color difference pixels for the background image and a difference between the constant and the weight value for the red-green color difference channel,
        a third summand being a summation of two addends, one of which is a product of a weight value for a blue-yellow color difference channel and blue-yellow color difference pixels for the foreground image and another of which is a product of blue-yellow color difference pixels for the background image and a difference between the constant and the weight value for the blue-yellow color difference channel, and
        a fourth summand being a summation of two addends, one of which is a product of a weight value for a texture channel and texture channel values for the foreground image and another of which is a product of texture channel values of the background image and a difference between the constant and weight value for the texture channel;
    adjusting the blended image according to obtained usage data for at least a portion of the foreground image; and
    displaying the blended image.

9. The computer-readable storage media as recited in claim 8, wherein the set of feature class data corresponds to color class data.

10. The computer-readable storage media as recited in claim 9, wherein the color class data corresponds to CIE Lab color model data.

11. The computer-readable storage media as recited in claim 8, wherein the set of feature class data corresponds to texture class data.

12. The computer-readable storage media as recited in claim 8, wherein the processing weight for each feature class is specified as a range of numbers between zero and one.

13. The computer-readable storage media as recited in claim 8, wherein the processing weight for each feature class is specified as a Boolean value.

14. The computer-readable storage media as recited in claim 8, wherein the adjusting the blended image includes blurring the background image.

15. The computer-readable storage media as recited in claim 8, wherein the adjusting the blended image includes diminishing an opacity of portions of the foreground imaged based on the usage data.

16. The computer-readable storage media as recited in claim 8, wherein the adjusting the blended image includes mapping values from the set of feature class data of the foreground image to a different set of feature class data.

17. A computer system for performing the computer-implemented method recited in claim 8.

18. A computer-readable storage media having computer-executable instructions that, when executed, cause one or more processors to perform a method for processing two or more images represented by a set of feature classes comprising:

associating each of the two or more images with a set of feature class data;

independently assigning a processing weight for each feature class;

processing the set of feature class data according to the independently assigned processing weight to generate a blended image, the act of processing summing includes:
multiple summands,
a first summand being a summation of two addends, one of which is a product of a weight value for a luminance channel and luminance pixels for an image and another of which is a product of luminance pixels for another image and a difference between a constant and the weight value for the luminance channel,
a second summand being a summation of two addends, one of which is a product of a weight value for a red-green color difference channel and red-green color difference pixels for the image and another of which is a product of red-green color difference pixels for the another image and a difference between the constant and the weight value for the red-green color difference channel,
a third summand being a summation of two addends, one of which is a product of a weight value for a blue-yellow color difference channel and blue-yellow color difference pixels for the image and another of which is a product of blue-yellow color difference pixels for the another image and a difference between the constant and the weight value for the blue-yellow color difference channel, and
a fourth summand being a summation of two addends, one of which is a product of a weight value for a texture channel and texture channel values for the image and another of which is a product of texture channel values of the another image and a difference between the constant and weight value for the texture channel;

adjusting the blended image according to obtained usage data for at least a portion of the two or more images; and displaying the blended image.

19. The computer-readable storage media as recited in claim 18, wherein the set of feature class data corresponds to color class data.

20. The computer-readable storage media as recited in claim 19, wherein the color class data corresponds to CIE Lab color model data.

21. The computer-readable storage media as recited in claim 18, wherein the processing weight for each feature class is specified as a range of numbers between zero and one.

22. The computer-readable storage media as recited in claim 18, wherein the processing weight for each feature class is specified as a Boolean value.

23. The computer-readable storage media as recited in claim 18, wherein adjusting the blended image includes blurring at least one of the two or more images.

24. The computer-readable storage media as recited in claim 18, wherein adjusting the blended image includes diminishing an opacity of portions of the one of the two or more images based on the usage data.

25. The computer-readable storage media as recited in claim 18, wherein adjusting the blended image includes mapping values from the set of feature class data of the foreground image to a different set of feature class data.

26. A computer system for performing the computer implemented method recited in claim 18.

\* \* \* \* \*